(12) United States Patent
Raksha et al.

(10) Patent No.: US 8,276,511 B2
(45) Date of Patent: *Oct. 2, 2012

(54) APPARATUS FOR ORIENTING MAGNETIC FLAKES

(75) Inventors: Vladimir P. Raksha, Santa Rosa, CA (US); Jay M. Holman, Santa Rosa, CA (US); Paul G. Coombs, Santa Rosa, CA (US); Charles T. Markantes, Santa Rosa, CA (US); Roger W. Phillips, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,743

(22) Filed: Mar. 28, 2011

(65) Prior Publication Data

US 2011/0168088 A1   Jul. 14, 2011

Related U.S. Application Data

(60) Division of application No. 11/623,190, filed on Jan. 15, 2007, now Pat. No. 7,934,451, which is a continuation-in-part of application No. 11/552,219, filed on Oct. 24, 2006, now Pat. No. 7,876,481, and a continuation-in-part of application No. 11/278,600, filed on Apr. 4, 2006, which is a continuation-in-part of application No. 11/313,165, filed on Dec. 20, 2005, now Pat. No. 7,604,855, which is a continuation-in-part of application No. 11/022,106, filed on Dec. 22, 2004, now Pat. No. 7,517,578, which is a continuation-in-part of application No. 10/386,894, filed on Mar. 11, 2003, now Pat. No. 7,047,883, said application No. 11/623,190 is a continuation-in-part of application No. 11/560,927, filed on Nov. 17, 2006, now Pat. No. 7,717,038.

(60) Provisional application No. 60/759,356, filed on Jan. 17, 2006, provisional application No. 60/777,086, filed on Feb. 27, 2006, provisional application No. 60/668,852, filed on Apr. 6, 2005, provisional application No. 60/410,546, filed on Sep. 13, 2002, provisional application No. 60/410,547, filed on Sep. 13, 2002, provisional application No. 60/396,210, filed on Jul. 15, 2002, provisional application No. 60/737,926, filed on Nov. 18, 2005.

(51) Int. Cl.
*B41F 13/10* (2006.01)
*B41F 31/00* (2006.01)
*B41B 1/02* (2006.01)
*B41N 1/20* (2006.01)
*G03G 19/00* (2006.01)

(52) U.S. Cl. ............. 101/375; 101/491; 101/401; 492/8

(58) Field of Classification Search .................. 101/375, 101/376, 401, 401.1, 491; 492/8, 18, 60
See application file for complete search history.

(56) References Cited

U.S. PATENT DOCUMENTS 7,934,451 B2 * 5/2011 Raksha et al. ................ 101/375
2007/0172261 A1 * 7/2007 Raksha et al. ................ 399/266

* cited by examiner

*Primary Examiner* — Judy Nguyen
*Assistant Examiner* — Leo T Hinze
(74) *Attorney, Agent, or Firm* — Matthew A. Pequignot; Pequignot + Myers LLC

(57) ABSTRACT

A printing apparatus includes a magnetic rotatable roller with a smooth even outer surface for aligning magnetic flakes in a carrier, such as an ink vehicle or a paint vehicle to create optically variable images in a high-speed, linear printing operation. Images can provide security features on high-value documents, such as bank notes. Magnetic flakes in the ink are aligned using magnetic portions of the roller, that can be formed by permanent magnets embedded in a non-magnetic roller body, or selectively magnetized portions of a flexible magnetic cover of the roller. In some embodiments, the roller is assembled for a plurality of interchangeable sections, which can include spinning magnets. Selected orientation of the magnetic pigment flakes can achieve a variety of illusive optical effects that are useful for decorative or security applications.

13 Claims, 9 Drawing Sheets

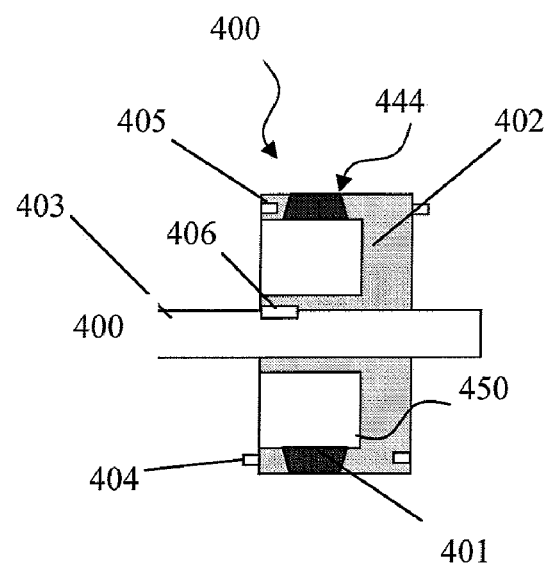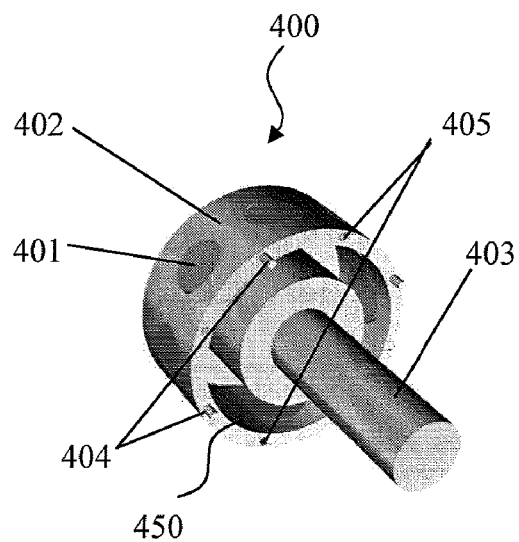
Fig. 5a  Fig. 5b
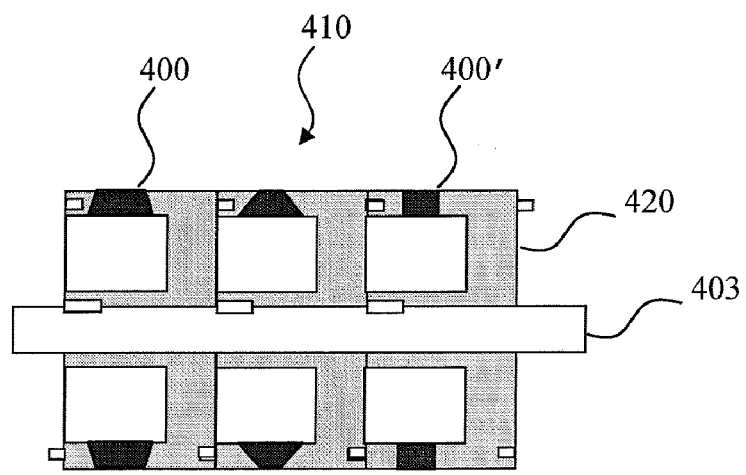
Fig. 5c

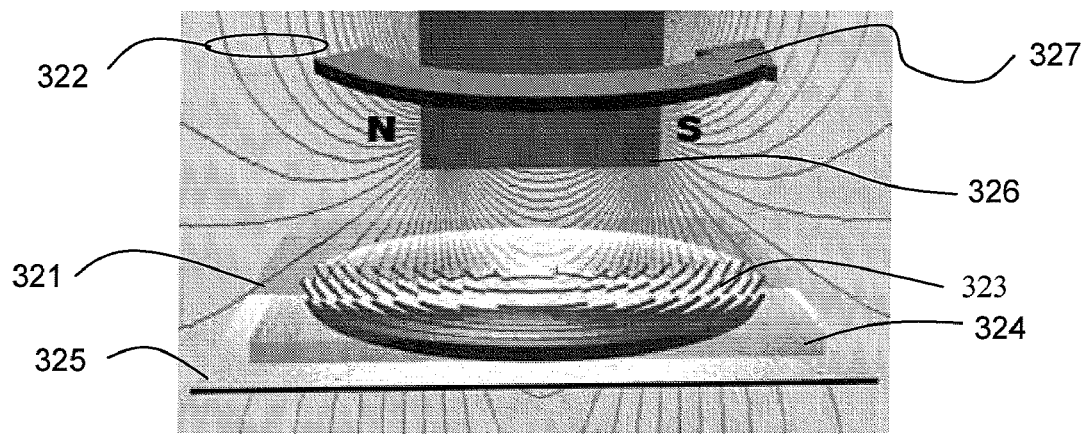
Fig. 8a
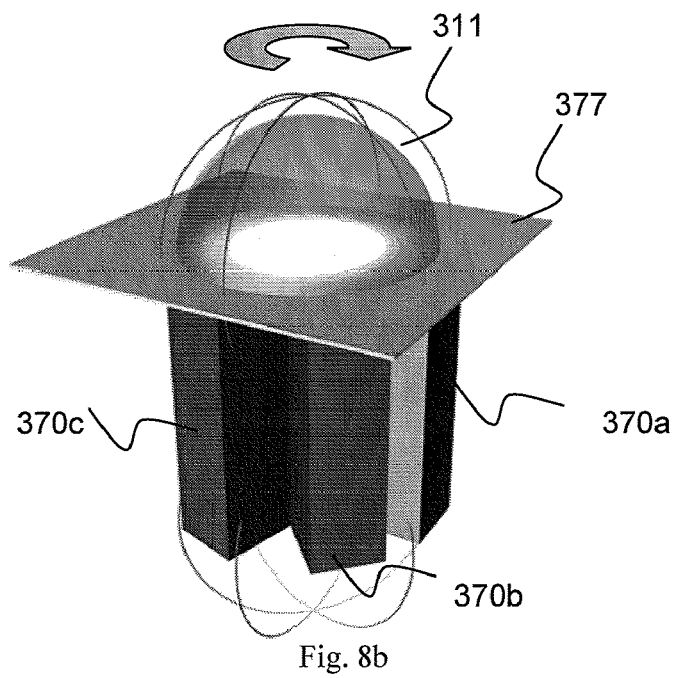
Fig. 8b
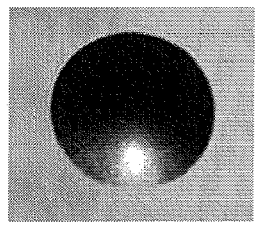 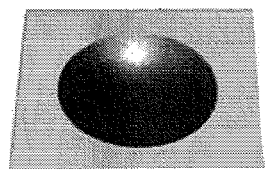
Fig.8c  Fig.8d

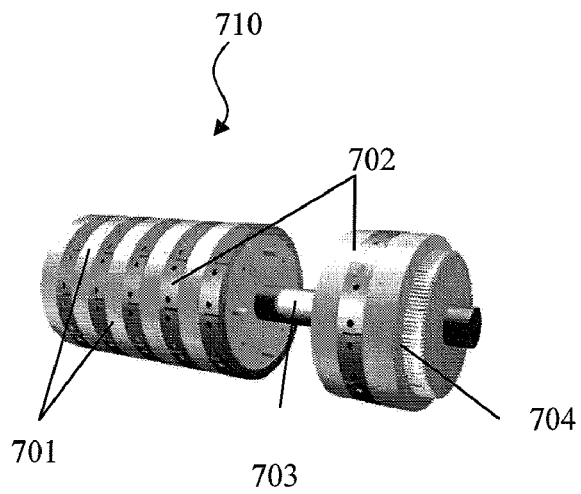
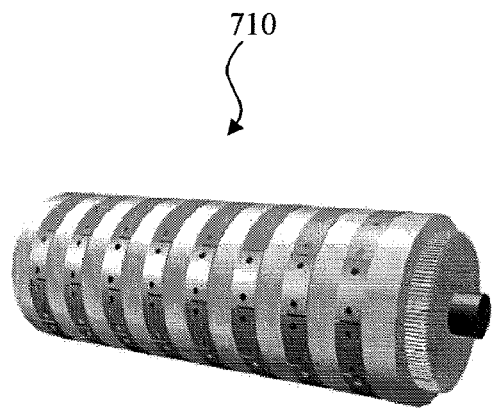
Fig. 9a          Fig. 9b
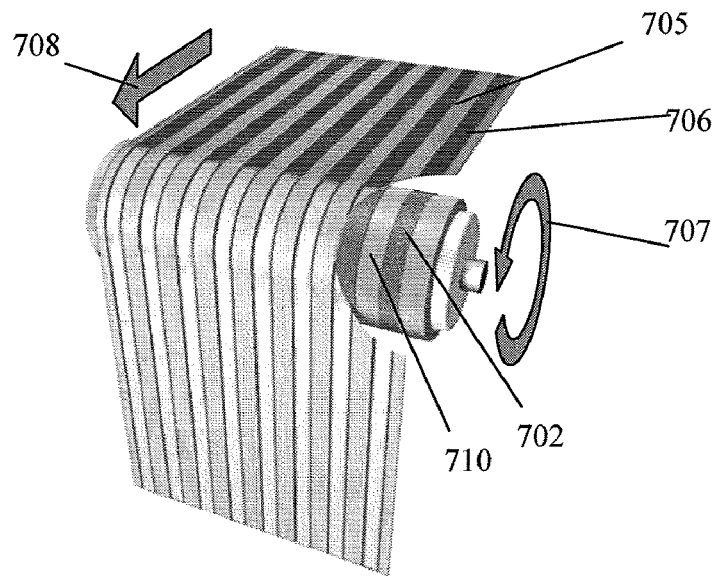
Fig. 10

APPARATUS FOR ORIENTING MAGNETIC FLAKES

CROSS-REFERENCE TO RELATED APPLICATIONS

The present invention is a divisional application of U.S. patent application Ser. No. 11/623,190, filed on Jan. 15, 2007, now U.S. Pat. No. 7,934,451, issued May 3, 2011, which claims priority from U.S. Provisional Patent Application Ser. No. 60/759,356, filed Jan. 17, 2006, entitled "Magnetic Rollers For Alignment Of Dispersed Magnetic Particles And Patterned Optical Security Image Device With Illusion Of Depth", and U.S. Provisional Patent Application Ser. No. 60/777,086, filed Feb. 27, 2006, and U.S. Provisional Patent Application Ser. No. 60/668,852, filed Apr. 6, 2005, the disclosures each of which are incorporated herein by reference in their entirety for all purposes.

U.S. patent application Ser. No. 11/623,190, filed on Jan. 15, 2007, now U.S. Pat. No. 7,934,451, is a continuation-in-part application of U.S. patent application Ser. No. 11/552,219, filed Oct. 24, 2006 now U.S. Pat. No. 7,876,481 and U.S. patent application Ser. No. 11/278,600, filed Apr. 4, 2006, both of which are continuation-in-part applications of U.S. patent application Ser. No. 11/313,165, filed Dec. 20, 2005, now U.S. Pat. No. 7,604,855 which is a continuation-in-part application of U.S. patent application Ser. No. 11/022,106, now U.S. Patent Application Publication No. 2005/0106367, filed Dec. 22, 2004, now U.S. Pat. No. 7,517,578 which is a continuation-in-part application of U.S. patent application Ser. No. 10/386,894, filed Mar. 11, 2003, now U.S. Pat. No. 7,047,883, issued May 23, 2006, which claims priority from U.S. Provisional Patent Application Ser. No. 60/410,546, filed Sep. 13, 2002, from U.S. Provisional Patent Application Ser. No. 60/410,547, filed Sep. 13, 2002, and from U.S. Provisional Patent Application Ser. No. 60/396,210, filed Jul. 15, 2002, the disclosures of which are hereby incorporated in their entirety for all purposes.

U.S. patent application Ser. No. 11/623,190, filed on Jan. 15, 2007, now U.S. Pat. No. 7,934,451, is a continuation-in-part application of U.S. patent application Ser. No. 11/560,927, filed Nov. 17, 2006, now U.S. Pat. No. 7,717,038 which claims priority from U.S. Provisional Patent Application Ser. No. 60/737,926, filed Nov. 18, 2005, the disclosures of which are incorporated herein by reference in it entirety for all purposes.

TECHNICAL FIELD

The present invention relates generally to optically variable pigments, films, devices, and images, and more particularly to an apparatus for aligning or orienting magnetic flakes, such as during a painting or printing process, to obtain an illusive optical effect.

BACKGROUND OF THE INVENTION

Optically variable devices are used in a wide variety of applications, both decorative and utilitarian. Optically variable devices can be made in variety of ways to achieve a variety of effects. Examples of optically variable devices include the holograms imprinted on credit cards and authentic software documentation, color-shifting images printed on banknotes, and enhancing the surface appearance of items such as motorcycle helmets and wheel covers.

Optically variable devices can be made as film or foil that is pressed, stamped, glued, or otherwise attached to an object, and can also be made using optically variable pigments. One type of optically variable pigment is commonly called a color-shifting pigment because the apparent color of images appropriately printed with such pigments changes as the angle of view and/or illumination is tilted. A common example is the "20" printed with color-shifting pigment in the lower right-hand corner of a U.S. twenty-dollar bill, which serves as an anti-counterfeiting device.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image printed with color-shifting pigment might not be noticed under uniform fluorescent ceiling lights, but more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

Optically variable devices can also be made with magnetic pigments that are aligned with a magnetic field after applying the pigment (typically in a carrier such as an ink vehicle or a paint vehicle) to a surface. However, painting with magnetic pigments has been used mostly for decorative purposes. For example, use of magnetic pigments has been described to produce painted cover wheels having a decorative feature that appears as a three-dimensional shape. A pattern was formed on the painted product by applying a magnetic field to the product while the paint medium still was in a liquid state. The paint medium had dispersed magnetic non-spherical particles, commonly referred to as flakes, that aligned along the magnetic field lines. The field had two regions. The first region contained lines of a magnetic force that were oriented parallel to the surface and arranged in a shape of a desired pattern. The second region contained lines that were non-parallel to the surface of the painted product and arranged around the pattern. To form the pattern, permanent magnets or electromagnets with the shape corresponding to the shape of desired pattern were located underneath the painted product to orient in the magnetic field non-spherical magnetic particles dispersed in the paint while the paint was still wet. When the paint dried, the pattern was visible on the surface of the painted product as the light rays incident on the paint layer were influenced differently by the oriented magnetic particles.

Similarly, a process for producing of a pattern of flaked magnetic particles in fluoropolymer matrix has been described. After coating a product with a composition in liquid form, a magnet with desirable shape was placed on the underside of the substrate. Magnetic flakes dispersed in a liquid organic medium orient themselves parallel to the magnetic field lines, tilting from the original planar orientation. This tilt varied from perpendicular to the surface of a substrate to the original orientation, which included flakes essentially parallel to the surface of the product. The planar oriented flakes reflected incident light back to the viewer, while the reoriented flakes did not, providing the appearance of a three dimensional pattern in the coating.

While these approaches describe methods and apparatus for formation of three-dimensional-like images in paint layers, they are not suitable for high-speed printing processes because they are essentially batch processes. U.S. Pat. No. 3,873,975 to Miklos et al issued Mar. 25, 1975, discloses a magnetic system for authentication and interrogation of security documents such as credit cards, airline tickets etc, which utilizes magnetic recording of security patterns in a record medium having magnetically detectable permanent fixed information pattern. Such a record medium is prepared by providing a sheet having a non-magnetic backing and a layer thereon incorporating magnetically anisotropic magnetizable particles which are temporarily free to rotate. The magnetizable particles at selected locations in the layer are magnetically aligned to form a fixed information pattern, such as an alphameric character, by passing the sheet adjacent a rotatable cylinder. The cylinder has a plurality of small permanent magnets mounted on a non-magnetic outer surface of the cylinder in a pattern corresponding to the fixed information pattern and has the magnets oriented to provide substantially unidirectional magnetic fields in the layer when adjacent thereto. The cylinder is rotated as the sheet is passed adjacent thereto to apply the magnetic fields in the layer to physically align the magnetizable particles at the selected locations to implant the fixed information pattern in the layer. The imprinted patterns form a security feature that can be magnetically read for document authentication.

The apparatus disclosed by Miklos et al, although apparently enabling a continuous magnetic printing of pre-determined two-dimensional security patterns by orienting magnetic particles in a recording media, has certain disadvantages.

First, the device of Miklos et al can magnetically imprint only substantially two-dimensional patterns copying geometrical arrangements of the magnets mounted on the cylinder, each magnet essentially providing a "dot" in the pattern imprinted in the magnetic layer. It would be very difficult if at all possible to use this technology to provide pre-determined substantially three-dimensional (3D) or complex arrangements of magnetic flakes that are required for providing optical images with variable or illusive optical effects, such as rolling objects and images with illusion of depth.

Second, in the device of Miklos et al, the magnets are mounted on the outer surface of the cylinder, and are therefore projecting therefrom. This can be highly disadvantageous in contact printing, when the cylinder is in contact, possibly under some pressure, with the sheet whereupon the magnetic layer is disposed.

Third, since in the device of Miklos et al, the magnets are fixedly attached to the surface of the cylinder, it cannot be used to form illusive images that can be produced by spinning magnets, as described in co-pending U.S. patent application Ser. No. 11/278,600, filed Apr. 4, 2006, the disclosure of which is incorporated herein by reference.

European patent application EP 1493590 describes a method and means for producing a magnetically induced design in a coating containing magnetic particles that also uses a rotatable cylinder to orient magnetic particles in pre-determined patterns. The device comprises a body of a composite permanent magnetic material having at least one flat or curved surface engraved with the pattern corresponding to the pattern of desirable indicia. The magnetic material is magnetized in the direction perpendicular to the surface. Irregularities in the surface, made with an engraving, produce changes in the direction and strength of the resulting magnetic field. These changes cause different alignment of magnetic particles in different parts of the wet ink that make possible a formation of an image with a shape corresponding to the shape of engraving. The device can be a permanently magnetized flexible plate mounted on a rotatable cylinder of a printing press, with the engraved surface having surface irregularities in the shape of the indicia located at the outer surface of the cylinder. The approach of EP 1493590 has however certain limitations. The steps required to produce the engravings in the permanent magnetic material can be cumbersome; furthermore, the printing with the engraved surfaces is generally directed to reproducing the engraved indicia or drawings, and is limited in terms of optical effects it can produce. For example, the inventors of this invention have found that, when printing in accordance with the teachings of EP 1 493 590 using color-shifting inks, a very poor color-shifting effect resulted. A color-shifting affect has the best appearance, i.e. large color travel and high chroma value, when the particles providing the effect are parallel or almost parallel to the surface of the substrate, which is hard to achieve using the device of EP 1 493 590.

It is therefore desirable to provide an apparatus for a high-speed in-line printing and painting that re-orients magnetic pigment flakes in pre-determined substantially 3D patterns for providing illusive and/or variable optical effects, and which would not involve using printing surfaces with protruding magnets.

It is also desirable to provide a rotatable roller for a high-speed in-line printing that can be easily assembled and disassembled for forming various combinations of optical images and variable or illusive optical effects.

It is another object of the present invention to provide an apparatus for continuous in-line printing that uses spinning magnets to orient magnetic flakes in pre-determined substantially 3D patterns for providing optical images with the illusion of depth.

SUMMARY OF THE INVENTION

In accordance with the invention, an apparatus is provided for orienting magnetic flakes in a fluid carrier printed on a substrate in a printing process, the apparatus comprising a rotatable roller for positioning with an outer surface proximate to the substrate, said roller comprising one or more magnetized portions for creating a magnetic field of a pre-determined configuration emanating from the outer surface of the roller into the substrate to orient the magnetic flakes in a selected pattern, wherein the outer surface of the roller is substantially even for providing a substantially uniform contact with the substrate across the outer surface of the roller during the linear printing process.

In accordance with one aspect of the invention, the rotatable roller comprises a plurality of magnetized portions separated by non-magnetized or differently magnetized portions of the roller for creating magnetic fields of pre-determined configurations emanating into the substrate for arranging the magnetic flakes on the substrate in predetermined patterns forming an image and/or an illusive optical effect.

In accordance with one aspect of the invention, the rotatable roller comprises a cylindrical body encased by a flexible sheet of a magnetic material which is selectively magnetized for providing the magnetized portions of the roller.

In accordance with another aspect of this invention, the rotatable roller comprises a cylindrical body of non-magnetic material having one or more cavities formed therein, and one or more permanent magnets positioned in said one or more cavities for forming the one or more magnetized portions of the roller, the one or more permanent magnets shaped for creating the magnetic field of the pre-determined configuration.

In accordance with another aspect of this invention, the rotatable roller comprises a plurality of roller sections detachably positioned side by side for forming a cylindrical body of the roller, wherein each roller section comprises one or more magnetized portions for creating a magnetic field of a pre-determined configuration emanating from the outer surface of the roller into the substrate to orient the magnetic flakes in a selected pattern; the outer surface of the roller is substantially even for providing a substantially uniform contact with the substrate across the outer surface of the roller during the linear printing process; the roller sections are interchangeable for forming different combinations of the magnetic flake patterns on the substrate. The magnetized portions can be formed by one or more permanent magnets positioned in cavities formed within the roller sections, each of the magnets shaped for providing a pre-determined configuration of the magnetic field in and about the substrate having magnetic flakes dispersed thereon.

In accordance with an aspect of the invention, the one or more cavities are shaped to fixedly hold the one or more permanent magnets flush with an outer surface of the cylindrical body.

In accordance with an aspect of the invention, the one or more magnets comprise a first magnet which is recessed relative to an outer surface of the cylindrical body of the roller.

In accordance with another aspect of this invention, the one or more permanent magnets comprise a first magnet that is rotatably positioned within one of the cavities, and a means for spinning the first magnet within the cavity during the printing process for providing an illusion of depth to the image formed by the first magnet on the substrate in the linear printing process.

In accordance with an aspect of the invention, the roller sections are rotatably mounted on the axle with a bearing, and the apparatus further comprises a first gear means for rotating the cylindrical body of the roller about the axle, and a second gear means coupling the first magnet with the axle for spinning the first magnet about an axis normal to the outer surface of the roller when the roller is rotated about the axle.

In one embodiment of this aspect of the invention, the cavity wherein the first magnet is rotatably positioned extends radially forming a passage from the axle to the outer surface of the first section, the apparatus further comprising a shaft rotationally positioned within the passage, the shaft having an outer end whereto one of the permanent magnets is attached, and an inner end, a gear means rotationally coupling the axle with the shaft for spinning the one of the permanent magnets when the section is rotated about the axle, and a gear means for rotating the cylindrical body of the roller about the axle.

Another aspect of the invention provides an apparatus for orienting magnetic flakes in a fluid carrier printed on a substrate in a printing process, the apparatus comprising a rotatable roller for positioning with an outer surface proximate to the substrate, said roller comprising: a cylindrical body comprising a cavity; a magnet rotatably positioned within the cavity for creating a magnetic field of a pre-determined configuration emanating from the outer surface of the roller into the substrate; and, a means for spinning the magnet within the cavity during the printing process for orienting the magnetic flakes in a predetermined pattern forming an image with an illusion of depth on the substrate.

BRIEF DESCRIPTION OF THE DRAWINGS

The invention will be described in greater detail with reference to the accompanying drawings which represent preferred embodiments thereof, wherein:

FIG. 1b is a simplified perspective view of one embodiment of the roller with magnetic assemblies for use in the apparatus illustrated in FIG. 1a;

FIG. 5a is a cross-sectional side view of one roller section incorporating static magnets according to another embodiment of the present invention;

FIG. 5b is a perspective view of the roller section illustrated in FIG. 5a;

FIG. 5c is a simplified diagram showing the sectionalized roller assembly;

FIG. 6b is a perspective view of the roller section illustrated in FIG. 6a;

FIG. 8a is a drawing illustrating the axial-symmetric hemisphere-shaped alignment of magnetic particles dispersed in a thin layer of the ink printed upon a substrate;

FIG. 8b is a perspective view of a same spinning magnet at three angles of its rotation after the magnet completed a single revolution around the vertical axis, with a sheet having flaked ink applied thereto disposed in the dome-shaped field;

FIGS. 8c and 8d are photographs of the prints with hemisphere-shaped alignment;

FIG. 9a is a perspective view schematically illustrating a partially assembled sectionalized roller with ring magnets continuously encircling the roller;

FIG. 9b is a perspective view schematically illustrating a fully assembled body of a sectionalized roller with ring magnets continuously encircling the roller;

FIG. 10 is a simplified diagram illustrating the printing of continuous images extending along the substrate in a linear printing apparatus according to an embodiment of the present invention using the roller shown in FIG. 8a;

FIG. 11a is a simplified perspective view of a roller having continuous magnets across its working surface;

FIG. 11b is a simplified side view of the roller shown in FIG. 10a;

FIG. 12 is a simplified diagram illustrating the printing of continuous images extending across the substrate in a linear printing apparatus according to an embodiment of the present invention using the roller shown in FIG. 10a.

DETAILED DESCRIPTION

Exemplary embodiments of the apparatus of the present invention for orienting magnetic flakes in a paint, ink or other fluid carrier printed on a substrate in a continuous linear process will now be described, first with reference to FIGS. 1a-1c.

Figure 1A:
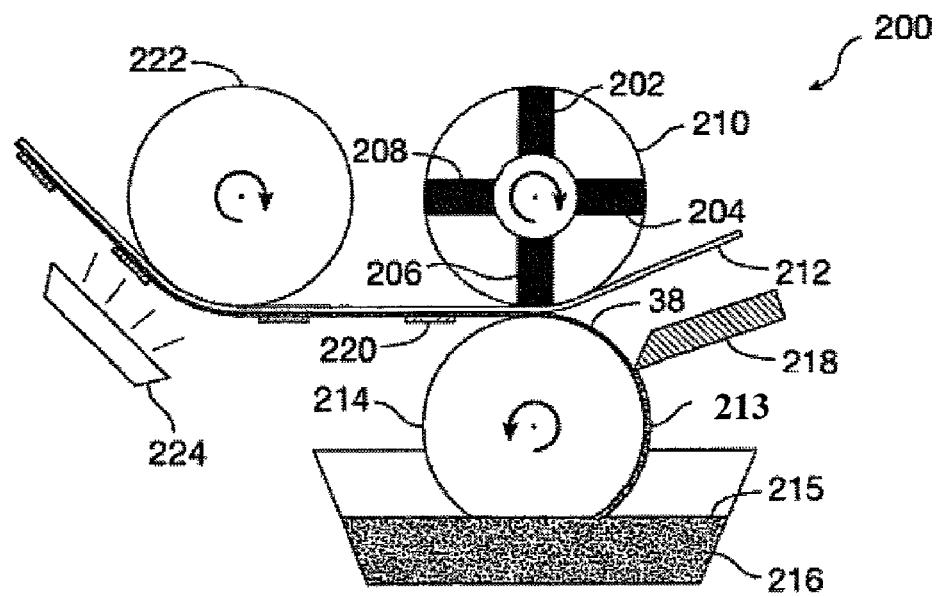
FIG. 1a is a simplified diagram showing a side view of a linear printing apparatus incorporating a magnetic roller according to an embodiment of the present invention.

FIG. 1a is a simplified side-view schematic of a portion of a printing apparatus 200 according to an embodiment of the present invention. An important part of the apparatus of the present invention is a magnetic roller, which is understood herein as a roller having magnetized portions and non-magnetized or differently magnetized portions. The term "magnetized portions" in relation to the roller of the present invention is used herein to mean a permanent magnet imbedded in the roller, or a selectively magnetized region of the roller adjacent to its surface, or an alternatively formed portion of a roller that has a pre-determined magnetization different from magnetization of surrounding it areas of the roller, so as to form a pre-determined magnetic field profile emanating from the roller.

In the printing apparatus illustrated in FIG. 1a, the magnetic roller of the present invention is embodied as an impression roller 210. Said impression roller 210 includes magnets 202, 204, 206, 208, which are located inside the impression roller 210, forming the magnetized portions of the roller arranged in a pattern that correlates with a printed image 220. A substrate 212, such as a continuous sheet of paper, plastic film, or laminate, moves between a print cylinder 214 and the impression roller 210 at high speed. The print cylinder 214 takes up a relatively thick layer 213 of liquid paint or ink 215 from a source container 216; the liquid paint or ink 215 contains platelet-like magnetic pigments, or flakes, for example as described U.S. Pat. No. 6,808,806, or in co-pending U.S. Patent Application Publication Nos. 2004/0051297, 2004/0166308, 2005/0123755, and 2006/0194040, incorporated herein by reference for all purposes. The term "magnetic pigment" is used to mean a pigment that will align in a magnetic field. For convenience of discussion, the terms "printing" or "printed" will be used to generally describe the application of pigments in a carrier to a surface, which may include other techniques, including techniques others might refer to as "painting".

The flakes are preferably reflective and are magnetically alignable or orientable within the optically transparent ink base, hereinafter referred to as the carrier, as long as the ink or paint remain fluid. The flakes can also be absorptive and/or diffractive, as described for example in a commonly owned U.S. Pat. No. 6,902,807 which is incorporated herein by reference, and can include taggent or taggent flakes, as described in co-pending U.S. Patent Application Publication Nos. 2005/0037192 and 2006/0035080, and/or color-shifting flakes.

The paint or ink is spread to the desired thickness on the print cylinder 214 with a blade 218. In accordance with this invention, the ink vehicle 215 can be clear or dyed. During printing of an image between the print cylinder 214 and the impression roller 210, the substrate 212 with a layer 213 of wet ink is moved into a magnetic field to form an illusory image. When the wet ink is exposed to a magnetic or electric field, flat magnetic or e-field alignable particles of the pigment align along magnetic lines of the field. The magnets in the impression roller thereby orient, i.e. selectively align, the magnetic pigment flakes in at least part of the printed image 220. Preferably, the magnetic field of the magnetic portions, e.g. 206, emanating from the outer surface of the roller into the substrate 212 is shaped to a desired, desirable, or predetermined configuration so as to orient the magnetic flakes in a selected pattern, e.g. providing an illusive optical effect. A tensioner 222 is typically used to maintain the desired substrate tension as it comes out of the impression roller 210 and the print cylinder 214, and the image on the substrate is dried with a drier 224. The drier could be heater, for example, or the ink or paint could be UV-curable, and set with a UV lamp.

In another embodiment, a cylinder incorporating magnetic portions, e.g. magnets 202, 204, 206 and 208, for aligning flakes in a liquid carrier 212 can be used as or in place of the tensioner 222 rather than as the impression roller 202. In yet another embodiment, a magnetic roller can be used as a third cylinder in the apparatus 200 located between the heater 224 and the print cylinder 214.

Figure 1B:
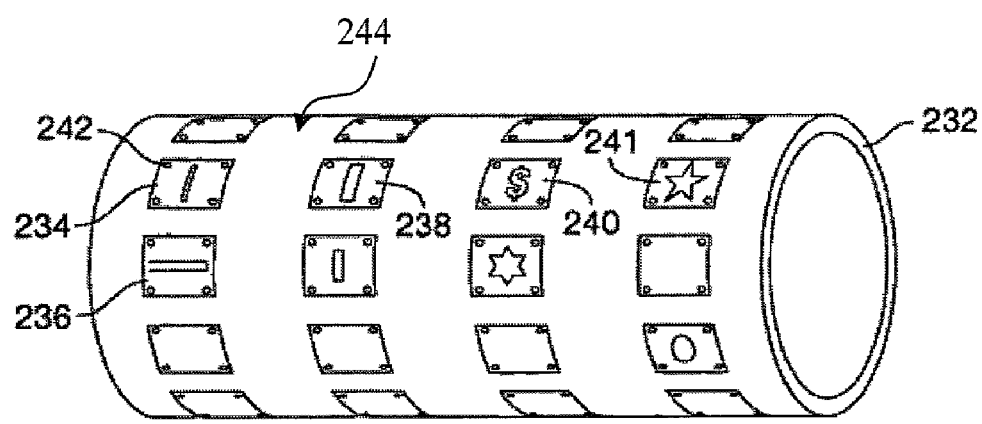

FIG. 1b shows a magnetic roller 232 that can be used in the apparatus 200; it has been described in U.S. Pat. No. 7,047,883, which is assigned to the assignee of the present application and is incorporated herein by reference. The roller could be a print cylinder or tensioner, as discussed in conjunction with FIG. 1a, or another roller in a printing system that contacts the print substrate before the ink or paint is fixed. Magnetic assemblies 234, 236, 238, 240, 241 are attached to the roller with screws 242, which allow the magnetic assemblies to be changed without removing the roller from the printer. The magnetic assemblies could be configured to produce flip-flop 234, 236 or rolling bar 238 images, or could be patterned magnetic material 240, 241 that produces a patterned image on the printed substrate, or other selected magnetic configuration. The magnetic structures on the roller are aligned to the sheet or roll to provide the desired magnetic field pattern to fields printed on the substrate with magnetic pigment flakes. The illustrated patterns represent flat patterns that follow the curve of the circumference of the roller.

It is advantageous in applications to have the outer surface 244 of the roller 232 sufficiently even or smooth, otherwise it can potentially deform or even damage the substrate 212. For these applications, it is preferred that the outer surface 244 does not have any protruding portions, resulting in a substantially even and uniform contact of the roller with the substrate across the outer surface of the roller.

Accordingly, in one preferred embodiment of the invention permanent magnets are built into a cylindrical body of the roller to provide the magnetic field of a pre-determined configuration as required for forming a desired image or an optical effect; alternatively, in another preferred embodiment a roller with a suitable magnetizable surface material is selectively magnetized in pre-determined patterns. In the description following hereinbelow, we will describe various embodiments of rollers having magnetic portions and the substantially even outer surface for orienting magnetic flakes in a continuous in-line printing process, e.g. using the apparatus 200. Various configurations of permanent magnets imbedded or inserted in the roller or otherwise attached thereto, as well as selectively magnetized portions of the roller, will be generally referred to hereinafter as the magnetized, or magnetic, portions of the roller, or simply as the magnetized or magnetic portions. Preferably, the outer surface of the magnetic rollers described hereinbelow with reference to FIGS. 2a-11 is substantially even and does not have projecting portions, and deviates from a best-fit cylindrical surface by less than +\−0.5 mm, and more preferably by less than +\−0.1 mm.

According to the present invention, the magnetic rollers can be divided in two families: discrete and continuous. A discrete roller has one or more magnetic portions, e.g. magnets or magnetic assemblies positioned adjacently to the outer surface of the roller and spatially separated from each other with non-magnetized or differently magnetized portions of the roller. The discrete roller is a roller that is used for forming multiple images or optical effects on the substrate in a repeated manner, e.g. like a checker board, wherein every single image or a part of the single image is aligned within margins of the magnetic field emanating from a particular magnetic portion of the roller through the outer surface of the roller into the substrate, e.g. as schematically illustrated in FIGS. 2c and 2d. A continuous roller provides non-interrupted printing, for example producing a continuous line or ribbon, on the substrate either along the surface of the substrate, i.e. in the direction of the substrate 212 movement in FIG. 1a, or across the substrate, e.g. in the direction normal to the plane of FIG. 1a or at an angle thereto.

According to another aspect of the present invention, a magnetic roller can be build as a unit with a solid body with attached or imbedded magnets, or as an assembly of several identical or different section of the roller with build-in magnetic systems. Convenience of the sectional magnetic roller is obvious in its flexibility: the roller with sections of one particular magnetic portion configuration can easily be disassembled and re-assembled again with inclusion of sections with different magnetic portions, for forming a different combination of images and/or optical effects on the substrate.

The magnets or magnetic assemblies in a discrete roller can be held still, i.e. static relative to the body of the roller, or positioned rotatably in a cavity in the cylindrical body of the roller for spinning or rotating within the body underneath the substrate during the printing process to provide an image with a striking illusion of depth, as described hereinbelow.

Figure 2A:
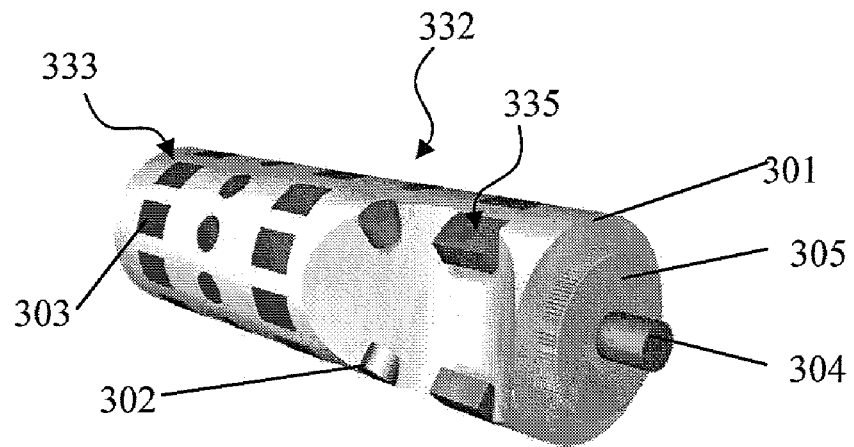
FIG. 2a is a simplified perspective view of a magnetic roller incorporating embedded permanent magnets.

FIG. 2a schematically illustrates a magnetic roller 332 for orienting magnetic flakes according to an embodiment of the present invention. The magnetic roller 332 has a solid cylindrical body 301, hereinafter also referred to as a cylindrical member or drum, of preferably non-magnetic material, wherein a plurality of cavities is formed, i.e. milled out of the body 301 from its outer surface 333. Permanent magnets of pre-determined shapes, as required for forming the desired flake patterns, e.g. magnets 302 and 303, are inserted in the cavities as shown by dark-shaded areas of the roller 332, forming magnetic portions of the roller 332. In FIG. 2a, the cavities are shown as dark-shaded areas with the magnets inserted therein, e.g. the magnets 302, 303 and 335, with a cut-out in a portion of the body 301 shown for the benefit of the viewer to illustrate the positions of the magnets, e.g. the cylindrical magnet 302 and the prism-shaped magnet 335, within the drum 301. The cavities have the pre-determined shape and dimensions of the permanent magnets, and the magnets are statically and immovably kept therein. In some embodiments, the magnets 302, 303 can be fixed in their position by glue, screws, brackets, etc, or can be press-fitted and kept in their positions by traction. The permanent magnets 302, 303, although shown by way of illustration having cylindrical and rectangular shapes, have at least their outer surfaces, e.g. as indicated by an arrow 335, shaped for creating magnetic fields of pre-determined configurations, so as to orient the magnetic flakes in desired 3D patterns when the roller is used in the printing apparatus 200. In the shown embodiment, the roller 332 is mounted on an axel 304 with bearings that are not shown in the figure, and a gear wheel 305 fixedly attached to the roller is further provided for rotating the roller 332 about the axel 304 during the printing process.

In one embodiment, the magnets 302, 303 are positioned flush with the outer surface 333 of the body 301, so that the outer surface of the roller 332 with the magnets 303, 302 therein is substantially even for providing substantially uniform contact with the substrate 212 across the outer surface of the roller 332 during the linear printing process. The term "contact" is used herein to mean either direct or indirect contact between two surfaces, i.e. via an intermediate sheet or plate. In another embodiment, at least one of the magnets 302, 303 is recessed relative to the outer surface 333 of the drum 301, and the recess is filled with a non-magnetic filler, e.g. an epoxy, tin, brass, or other, to make the outer surface of the roller substantially even as described hereinabove. The ability to have different magnets at different distances from the ink layer is advantageous for creating different types of optical effects provided by the respective magnetic flake arrangements. Generally, for forming flake arrangements providing sharp image transitions, as for example for forming a flip-flop image, the ink-magnet distance should be minimized. However, for forming images or optical effects wherein transitions in the image should be smeared, e.g. for providing an illusion of depth as in a rolling bar image, the magnets are preferably positioned at a larger distance from the ink layer, for example between 0.125" to 0.75" for a rolling bar image depending on particular requirements of the graphics. The rolling bar and flip-flop images, and magnet arrangements that can be used for their fabrication are described, for example, in the commonly owned U.S. Pat. No. 7,047,883 which is incorporated herein by reference.

Figure 2B:
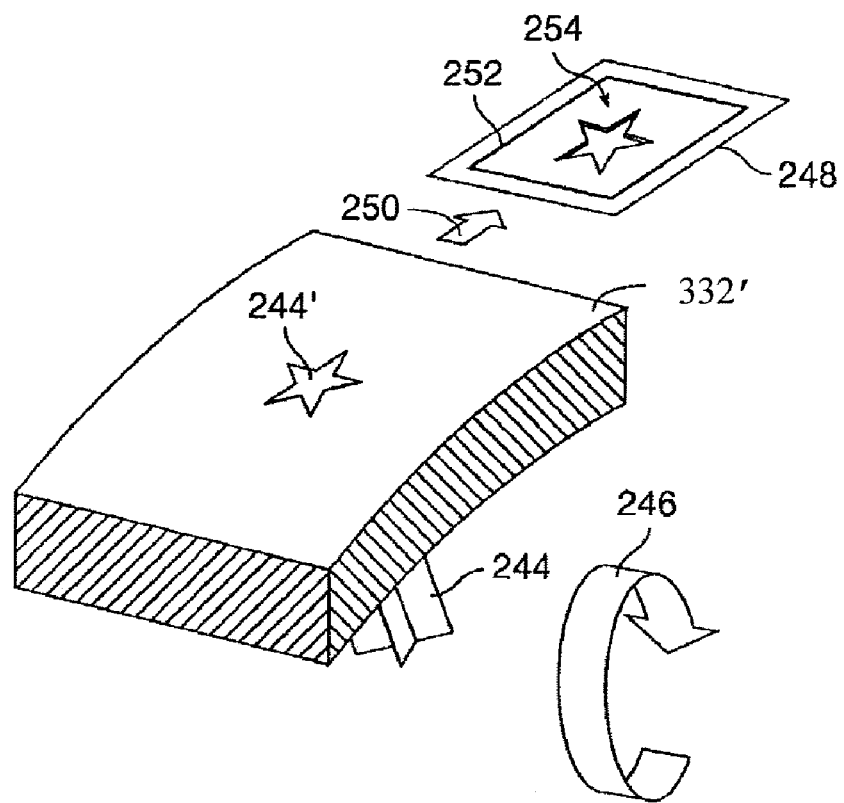
FIG. 2b is a simplified perspective view of a portion of the roller shown in FIG. 2a with a embedded magnet having a star-shaped outer surface.
Figure 2C:
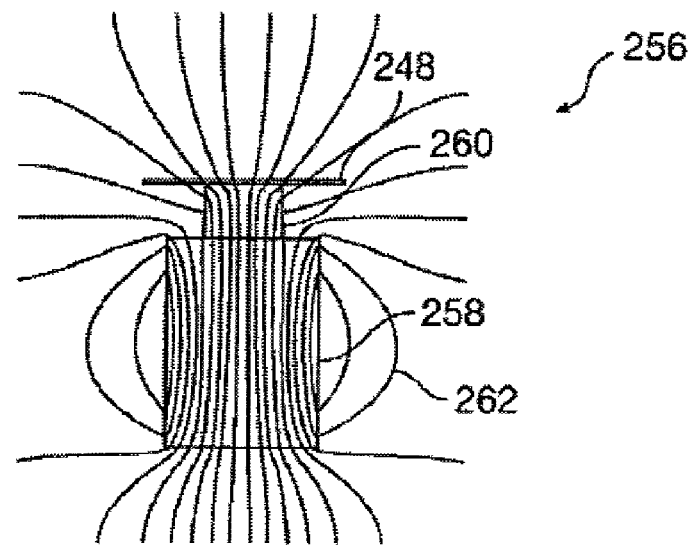
FIG. 2c is a simplified side view of magnetic assembly for printing illusive three-dimensional images according to an embodiment of the present invention.
Figure 2D:
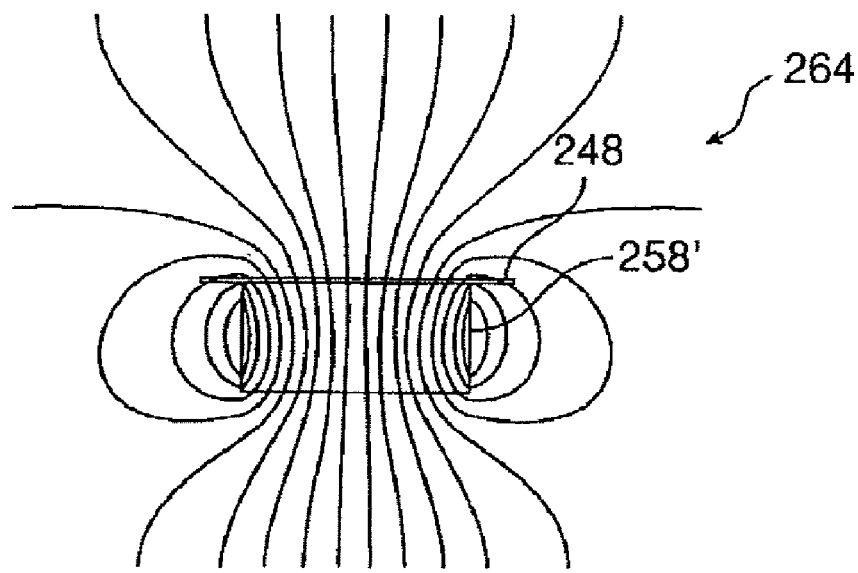
FIG. 2d is a simplified side view of a magnet for printing illusive three-dimensional images according to another embodiment of the present invention.

FIG. 2b is a simplified perspective section of a portion of a roller 332' with a magnetic assembly 244 embedded in the roller. The magnetic assembly has a cross section in the shape of a star, and it surface 244' is substantially flush with the outer surface of the roller. The magnetic assembly could be shaped permanently magnetized material, as illustrated in FIG. 12F, or have a tip section of SUPERMALLOY, MU-METAL, or similar material, as illustrated in FIG. 12E, below. The roller rotates in the direction of the first arrow 246 and a paper or film substrate 248 travels in the direction of the second arrow 250. An ink field 252 including magnetic pigment flakes has been printed on the substrate. The field was over the surface of the star-shaped magnetic assembly when the roller was proximate to the substrate, and an illusive optical feature 254 in the shape of a star was formed in the field. In a preferred embodiment, the magnetic pigment flakes are fixed while the magnetic assembly is in contact with the substrate.

In one embodiment, the illusive optical effect 254 is a star with an apparent depth much deeper than the physical thickness of the printed field. Such a star can be formed, for example, with the outer surface 244' of the magnet 244 is recessed relative to the outer surface of the roller 332'.

FIG. 2c is a computer simulated side view of a magnetic assembly 256 with a permanent magnet 258 providing the magnetic field that is directed to the substrate 248 by a patterned tip 260 of SUPERMALLOY or other high-permeability material. The modeled magnetic field lines 262 are shown for purposes of illustration only. Some "supermagnet" materials are hard, brittle, and generally difficult to machine into intricate shapes. SUPERMALLOY is much easier to machine than NdFeB magnets, for example, and thus can provide an intricate magnetic field pattern with sufficient magnetic field strength to align the magnetic pigment flakes in the desired pattern. The low remnant magnetization of SUPERMALLOY and similar alloys make them easier to machine, as well.

FIG. 2d is a computer simulated side view of a magnetic assembly 264 with a shaped permanent magnet 258'. The entire length of the magnet does not have to be shaped, but only that portion that produces the desired field pattern at the substrate 248. Although some materials that are commonly used to form permanent magnets are difficult to machine, simple patterns may be formed in at least the tip section. Other materials that form permanent magnets are machinable, and may provide sufficient magnetic strength to produce the desired illusive optical effect. Similarly, magnet alloys might be cast or formed into relatively complex shapes using powder metallurgy techniques.

Figure 3:
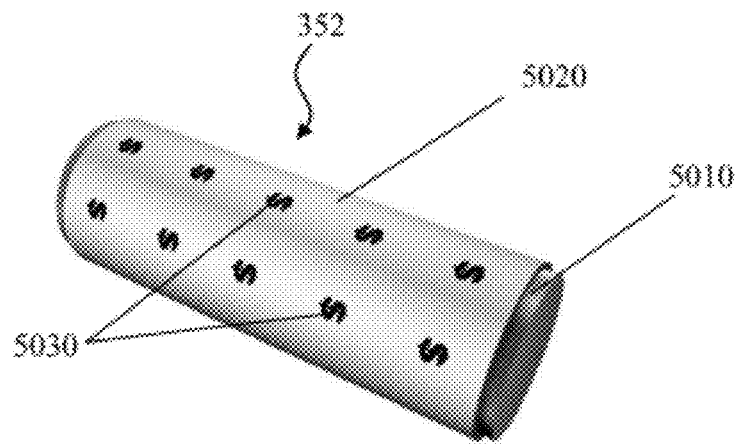
FIG. 3 is a simplified perspective view of a roller having a selectively magnetized outer shell according to an embodiment of the present invention.

Another embodiment of the present invention is illustrated in FIG. 3. According to this embodiment, a magnetic roller 352 is fabricated by wrapping a flexible sheet 5020 of magnetic material with selectively magnetized portions 5030 around a cylindrical member or drum 5010, which is preferably fabricated from a non-magnetic material. The flexible and generally non-magnetized, apart from the portions 503, sheet 5020 is encasing the drum 5010 and is held on its surface by a pressure-sensitive adhesive. Before wrapping, areas 5030 of the sheet 5020 were selectively magnetized through to form magnetized portions of the sheet 5020 having predetermined shapes, shown herein as dollar signs by way of example. Assembled roller 352 has a smooth non-interrupted surface formed by the outer surface of the sheet 5020. A sheet with one magnetization pattern can easily be replaced by another when required. In another embodiment, the flexible sheet of magnetizable material 5020 is first uniformly magnetized in one magnetic orientation, and then portions of the uniformly magnetized sheet of a pre-determined shape or shapes are selectively magnetized in another magnetic orientation or orientations, so that the magnetic portions 503 of the roller 352 are separated from each other by a differently magnetized portions of the sheet 5020.

This method of forming a magnetic roller has many advantages. The magnets formed in the sheet 502 by selective magnetization do not require carving or removing the material to vary the magnetic field. An image 503 of an object, logo or indicia is made within the magnetic material of the sheet 502 so that the magnet provides a field that corresponds to the object, logo, or indicia when the field is used to align flakes in paint or ink, as described in detail in co-pending U.S. patent application Ser. No. 11/560,927, which is incorporated herein by reference. Advantageously, the object, logo or indicia encoded into the flexible magnetic sheet 502 by way of selected magnetization cannot be seen, but is present and generates a magnetic field that aligns flakes placed on a substrate in the field to replicate the object, logo or indicia. The magnetic sheet 502 provides a naturally even outer surface of the roller 352, without protrusions and recesses, thereby enabling bringing the roller 352 in an intimate contact with the substrate 212 of the printing apparatus 200 without the risk of deforming the substrate even when the pressure is applied. The co-pending U.S. patent application Ser. No. 11/560,927 provides a detailed description of various methods of the selective magnetization of the sheet 502 to form magnetized portions of the sheet for aligning magnetic flakes on the substrate in pre-determined or selected patterns providing various images and/or optical effects.

Generally, the magnetic flake pattern created on the substrate by a magnetized portion or portions of the roller in accordance with the present invention forms an image of an object, indicia, or a logo on the substrate, or adds an illusive optical effect such as an illusion of depth or motion to the image printed on the substrate with the magnetic ink. In some embodiments, the image provides a dynamic optical effect when viewed at a varying viewing angle or at a varying illumination angle. When the ink is illuminated by a light source and observed with a naked eye or with an optical instrument the differently aligned platelet-like shaped magnetic pigment particles or flakes reflect incident light differently. One portion of the particles is so oriented with respect to the substrate, to the light source and to the observer that it reflects coming light rays right into the eye of the observer. Another portion of the particles of the print reflects light rays in different directions because they are tilted at different angles relative to the direction of the observer. When the substrate with printed coating is tilted with respect to the light source or the observer the first portion of the pigment particles does not reflect the light toward the observer any more. These particles start to reflect the light in different direction while the particles of the second portion start to reflect the light rays in the direction of the observer. When particles are aligned gradually in the layer of the ink, tilting of the substrate causes appearance of an illusive motion effect. When particles are aligned along the lines of a magnet that was shaped in predetermined pattern a portion of the printed layer repeats the shape of the magnet creating an effect of three-dimensionality. In this region it appears as if the image comes out of the substrate toward the observer.

Examples of Printed Illusive Images

Figure 4A:
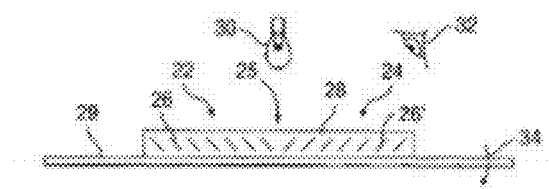
FIG. 4a is a simplified cross section of a printed image that will be referred to as a "flip-flop"

By way of example, FIGS. 4a,b illustrate some of the images or optical effects that can be produced using the hereinabove described embodiments of the rollers with reference to FIGS. 1a, 2a-3. FIG. 4a is a simplified cross sectional view shown in the U.S. Pat. No. 7,047,883, of a printed image 20 that is referred to as a flip-flop, and which is an example of a dynamic optical effect that can be produced by suitably orienting magnetic flakes in a fluid carrier printed on a substrate. The flakes are shown as short lines in the cross-sectional view. The figures are not drawn to scale. A typical flake might be twenty microns across and about one micron thick, hence the figures are merely illustrative.

The flip-flop includes a first printed portion 22 and a second printed portion 24, separated by a transition 25. Pigment flakes 26 surrounded by carrier 28, such as an ink vehicle or a paint vehicle have been aligned parallel to a first plane in the first portion, and pigment flakes 26' in the second portion have been aligned parallel to a second plane; this results in a substantially-3D pattern of magnetic flakes that can be produced using suitably shaped magnetic field emanating from the outer surface of the aforedescribed magnetic rollers having magnetized portions of pre-determined shapes; examples of such magnetic structures are given in the U.S. Pat. No. 7,047,883.

Generally, flakes viewed normal to the plane of the flake appear bright, while flakes viewed along the edge of the plane appear dark. For example, light from an illumination source 30 is reflected off the flakes in the first region to the viewer 32. If the image is tilted in the direction indicated by the arrow 34, the flakes in the first region 22 will be viewed on-end, while light will be reflected off the flakes in the second region 24. Thus, in the first viewing position the first region will appear light and the second region will appear dark, while in the second tilted viewing position the fields will flip-flop, the first region becoming dark and the second region becoming light. This provides a very striking visual effect. Similarly, if the pigment flakes are color-shifting, one portion may appear to be a first color and the other portion another color when viewed at a first viewing or illumination angle, and said portions may appear to switch colors when viewed at a second viewing or illumination angle. The process of fabricating diffractive flakes is described in detail in U.S. Pat. No. 6,692,830. U.S. Patent Application Publication No. 2003/0190473, describes fabricating chromatic diffractive flakes. Producing a magnetic diffractive flake is similar to producing a diffractive flake, however one of the layers is required to be magnetic.

The carrier is typically transparent, either clear or tinted, and the flakes are typically fairly reflective. For example, the carrier could be tinted green and the flakes could include a metallic layer, such as a thin film of aluminum, gold, nickel, platinum, or metal alloy, or be a metal flake, such as a nickel or alloy flake. The light reflected off a metal layer through the green-tinted carrier might appear bright green, while another portion with flakes viewed on end might appear dark green or other color. If the flakes are merely metallic flakes in a clear carrier, then one portion of the image might appear bright metallic, while another appears dark. Alternatively, the metallic flakes might be coated with a tinted layer, or the flakes might include an optical interference structure, such as an absorber-spacer-reflector Fabry-Perot type structure.

Figure 4B:
FIG. 4b is a simplified cross section of a printed "rolling bar" image with an illusion of depth.

FIG. 4b is a simplified cross section of a printed image 42 of a kinematic optical device that is referred to as a "rolling bar" for purposes of discussion, according to another embodiment of the present invention. The image includes pigment flakes 26 surrounded by a transparent carrier 28 printed on a substrate 29. The pigment flakes are aligned in a curving fashion, in a pattern substantially reproducing reflective planes of a Fresnel cylindrical mirror. As with the flip-flop, the region(s) of the rolling bar that reflect light off the faces of the pigment flakes to the viewer appear lighter than areas that do not directly reflect the light to the viewer, creating an impression of light reflected from a polished metallic cylinder. This image provides a light band(s) or bar(s) that appear to move, or "roll" across the image when the image is tilted with respect to the viewing angle, assuming a fixed illumination source(s).

The bar may also appear to have depth, even though it is printed in a plane. The virtual depth can appear to be much greater than the physical thickness of the printed image; this aspect of the image is referred to as an illusive optical effect. The tilting of the flakes in a selected pattern reflects light to provide the illusion of depth or "3D", as it is commonly referred to. A three-dimensional effect can be obtained by having a shaped magnet or magnets placed e.g. in a cavity of the roller 332 in a recessed position at some distance from the paper or other substrate with magnetic pigment flakes printed on the substrate in a fluid carrier. The flakes align along magnetic field lines forming pre-determined 3D patterns, and thereby creating the 3D image after setting (e.g. drying or curing) the carrier. The image often appears to move as it is tilted, hence kinematic 3D images may be formed.

Figure 4C:
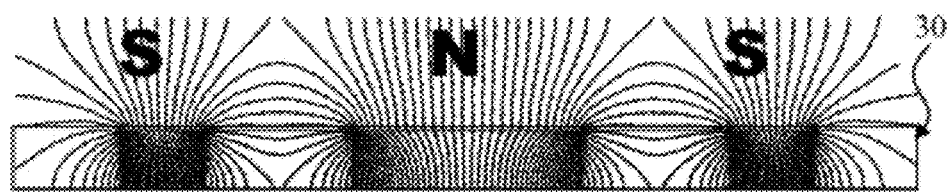
FIG. 4c is a diagram of the magnetic field from the magnetized sheet having a two-pole orientation.

Alternatively, a substantially 3D effect can be obtained by suitably magnetizing a selected area or region of the magnetizable upper sheet 502 encasing the roller 352, so that the magnetic field emanating from the upper surface of the selectively magnetized portion would substantially reproduce the magnetic field of the recessed suitably shaped permanent magnet or magnets. By way of example, FIG. 4c shows a selectively magnetized sheet 30 wherein magnetized portions of the sheet, which are shown by areas with high density of magnetic force lines, are formed so that the magnetic field emanating from the sheet 30 is substantially a magnetic field of a magnet having a two-pole orientation in the plane of the sheet 30.

Sectional Roller

Referring now to FIGS. 5a-c, another aspect of the invention provides a sectionalized magnetic roller for use in the alignment of magnetic flakes in pre-determined patterns. The sectionalized roller 410 schematically illustrated in cross-section in FIG. 5c has a cylindrical body 420, also referred to herein as cylindrical member or drum, that is assembled or formed from a plurality of cylindrical roller sections 400 which are detachably positioned side by side for forming the cylindrical body of the roller 410. In FIG. 5c, the drum 410 is shown by way of example as formed from 3 cylindrical roller sections. Each of the sections 400 has one or more cavities for inserting permanent magnets of pre-determined shapes therein, as described hereinabove with reference to a solid roller illustrated in FIG. 2a. The roller sections 400 are mounted on an axle 403 as shown in FIGS. 4a, 4b and 4c, and are positioned side by side thereon. Advantageously, the roller sections in the assembled roller are interchangeable, so that different combinations of images can be formed during printing.

FIGS. 5a and 5b schematically show a single roller section 400; in this embodiment, the roller section 400 has a partially hollow body 402 having cavities wherein permanent magnets 401 of predetermined shape or shapes are fixedly positioned and held; the cavities 401, which are referred to in this specification using same reference labels as the respective magnets located therein, are open to an outer surface 444 of the roller section 400. For illustrative purposes, the magnets 401 positioned in the respectively shaped cavities are shown to be cone-shaped. In other embodiments the magnets 401 can be of any shape suitable for orienting the magnetic flakes in pre-determined patterns so to provide the desired images or optical effects. The roller section 400 is recessed at one side to form a ring-like opening, or recess 450 that can be used to facilitate the insertion of the magnets into the cavities 401. The roller section 403 has a centrally located cylindrical passage for the axle 403, which extends through the final assembly 410 and on which other cylindrical sections can be slidably mounted. The sections 400 have each a set of pins 404 and matching holes 405, together forming a first locking means for mutually locking the roller sections in the assembly in a fixed relative orientation for rotating together on the axle 403. Pins 404 of a single section go into corresponding holes 405 of another section locking sections together as shown in FIG. 5c thereby providing the roller integrity. In other embodiments, alternative locking means can be used to rotationally fix the roller sections relative to each other in the sectional roller assembly 410.

Second locking means are provided for locking the sections 400 on the axle 403 for rotating together with the axle. In the shown embodiment the second locking means are formed by a key 406 that extends into suitably shaped slits provided in both the cylindrical body 402 of the roller section and in the axle 403 thereby preventing rotation of the section 400 around the axle 403. Alternatively, the key 406 can be integral with either the section body 402 or the axle 403 projecting therefrom. The sectional roller enables assembly of sections 400 with different magnetic configurations as shown in FIG. 4c, wherein differently shaped dark shaded areas represent permanent magnets of different shapes as desired for forming a particular pattern of magnetically induced images or optical effects in the magnetic layer on the substrate 212.

The aforedescribed sectionalized approach is very helpful for fabrication of a roller with a magnet spinning inside of the roller about an axis that is generally normal to the outer surface of the roller, so that in the linear printing process the outer surface of the magnet is spinning in the plane of the substrate 212 when the roller's rotation brings the magnet to a proximate to the substrate location, as illustrated e.g. by the magnet 206 in FIG. 1a.

Figure 6A:
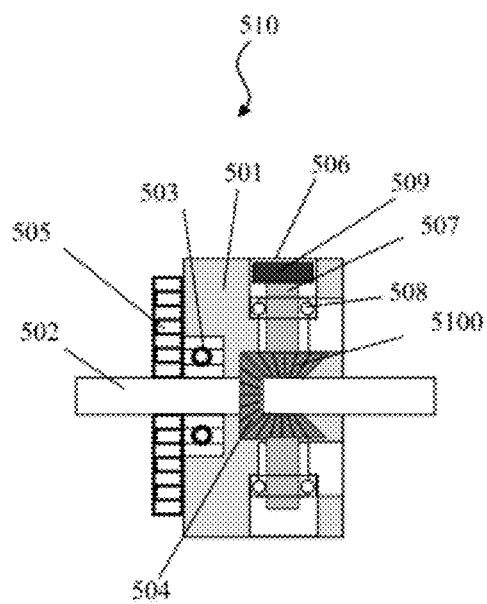
FIG. 6a is a cross-sectional side view of one roller section incorporating spinning magnets according to another embodiment of the present invention.
Figure 6B:
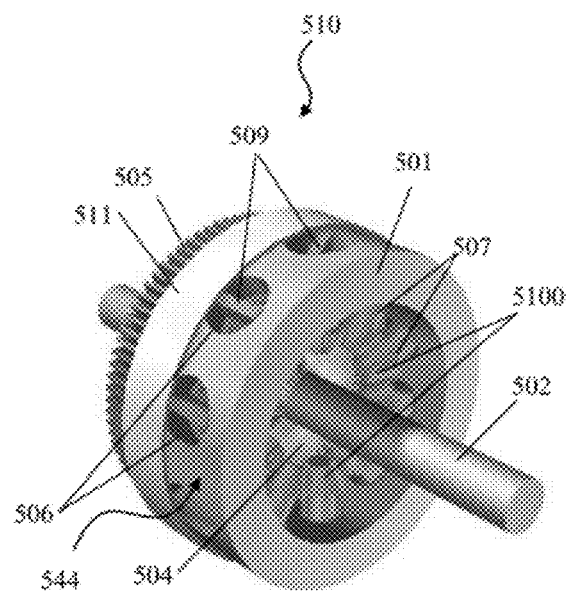
Figure 7A:
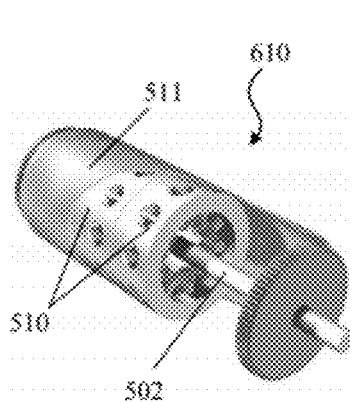
FIG. 7a is a perspective view schematically illustrating a partially assembled sectionalized roller with spinning magnets.
Figure 7B:
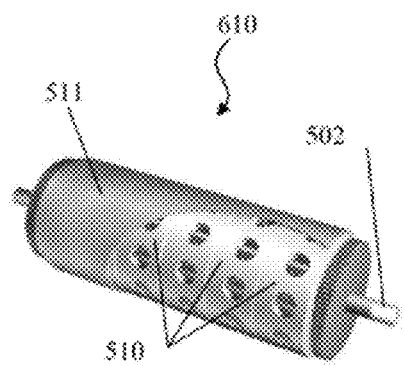
FIG. 7b is a perspective view schematically illustrating a fully assembled sectionalized roller with spinning magnets.

An embodiment 510 of a roller section with spinning magnets is schematically shown in FIGS. 6a and 6b, wherein FIG. 6b provides a perspective view of the roller section 510, while FIG. 6a shows the roller section 610 in cross-section. A cap-shaped section body 501 of the roller section 510 is rotatably positioned, or mounted on an axle 502 using ball bearing 503. The axle 502 has a first 45° bevel gear 504 statically mounted, e.g. press-fitted, thereon. The section body 501 receives a rotating moment from a gear wheel 505 fixedly attached thereto and driven by a pinion that is not shown in the drawings. The section body 501 has one or more cavities 506 which extend radially forming a passage from the outer surface 544 of the section 501 towards the axle 502. A cylindrical shaft 507 is positioned within the passage 506. The shaft 507 is rotationally coupled to the section body 501 by a ball bearing 508. A permanent magnet 509 of is attached to one end of the shaft 507; the magnet 509 is hereinafter also referred to as the first magnet. In the shown embodiment, the first magnet 509 is recessed relative to an outer surface of the cylindrical body of the roller. A second 45° bevel gear 5100 is provided at the other end of the shaft 507. Gears 5100 and 504 have a matching pitch; they form gear means, hereinafter also referred to as second gear means, for coupling the first magnet 509 with the axle 502 for spinning the first magnet about an axis normal to the outer surface of the roller 610 when the roller is rotated about the axle. A cover sheet 511 encases the section body 501 in a final roller assembly providing a smooth and even outer surface of the sectionalized roller, as illustrated in FIGS. 7a and 7b. In different roller assemblies, the cover sheet 511 can have a different thickness to space the magnets 506 from the substrate 212, in dependence on the magnets strength, ink viscosity, pigment particles' magnetic properties, press running rate, and other factors. The magnets 506 are preferably recessed within the body 501, so that their outer surface is separated from the cover 511 by a gap. The gear wheel 505, hereinafter referred to as the first gear means, is used for rotating the cylindrical body of the roller 610 about the axle 502.

When the gear 505 is driven, it rotates the section body 501 on the axle 502 that remains static; the rotational motion of the body 501 is translated by the bevel gears 504, 5100 to the shafts 507, which spin about their radially oriented axes, thereby spinning the magnets 509 inside of the cylindrical passages, or cavities 507, while simultaneously moving in a circle orbit with the section 501 about the axle 502 along a planetary-like trajectory creating a magnetic field of a desired dome-like configuration emanating from the outer surface of the roller, and into the substrate 212 at pre-determined locations when the rotation of the roller brings the magnet into proximity to the substrate with the magnetically alignable flakes dispersed thereon. In another embodiment, the magnets 509 can be driven independently on the rotation of the roller body, e.g. by an electrical motor or motors placed for example within the section body 501.

FIGS. 7a and 7b schematically illustrate a sectionalized magnetic roller 610 assembled from sections 510. Each of the sections of the roller has a set of matching pins and holes not shown in FIGS. 6a-7b that are similar to those described with reference to in FIGS. 5a and 5b. The sections 510 are assembled together side by side on the axle 503 so as to form a cylindrical body, also referred to therein as a cylindrical member, of the roller 610. The assembled sections are then covered by the cover 511 which encases the sections so as to form the magnetic roller 610 and to provide a smooth even outer surface to the roller 610 even when the magnets 509 are recessed. FIG. 7a shows a partially assembled roller, while FIG. 7b shows a completely assembled roller. In FIGS. 7a and 7b, the cover 511 is shown with a cut out for illustration purposes.

Spinning magnets can be advantageously used to form dome-shaped magnetic fields, which can be used for orienting magnetic flakes in a circular pattern forming a Fresnel reflector, thereby forming hemispherical images with illusion of depth, as described in commonly assigned co-pending U.S. patent application Ser. No. 11/278,600. FIG. 8a reproduced from this application illustrates an axial-symmetric hemisphere-shaped alignment of magnetic particles 323 dispersed in a thin layer of the ink 324 printed upon a substrate 325 in a printed non-concave Fresnel mirror arrangement. Reference numeral 321 denotes the cross section of the field having lines 322 which emanate from the magnet 326 which is rotated, i.e. spinned in the direction of the arrow 327. According to the present invention, the magnet 326 is positioned in a cavity of a magnetic roller which is not shown in the figure, with its axis of rotation/spinning being generally normal to the axle of the roller. FIG. 8b is another illustration of the fabrication of a semispherical image with the illusion of depth using a spinning magnet 370 to form a dome-like magnetic field 311 emanating into the substrate 377. The magnet 370 has a rectangular cross-section and is shown in three different positions 370a, 370b and 370c during the spinning. The magnet should spin at a substantially faster angular velocity than that of the rotation of the roller wherein the spinning magnet is positioned, so that the magnetic pigment in the ink on the substrate would 'feel' the averaged dome-shaped magnetic field 311 of the spinning magnet during a period of time the spinning magnet is proximate to the substrate. FIGS. 8c and 8d are photographs of the prints with gradually varying tilting of the flakes produced by the spinning magnet, which concentrically orients the flakes to form what is substantially a Fresnel parabolic minor pattern, thereby providing the images with the illusion of depth. More particularly FIG. 8c is a photograph tilted with its upper edge toward the observer, while photograph 8d is tilted with its upper edge away from the observer.

Although the description given hereinabove with reference to FIGS. 6a-7b relates to a sectionalized magnetic roller, other embodiments of the invention provide a magnetic roller wherein one or more spinning magnets are positioned within cavities formed in a solid cylindrical body of the roller, or a roller body that is assembled from individual sections that are permanently attached to each other.

Accordingly, this aspect of the invention generally provides an apparatus for orienting magnetic flakes in a fluid carrier printed on a substrate in a printing process, the apparatus comprising a rotatable roller for positioning with an outer surface proximate to the substrate, said roller comprising: a cylindrical body comprising a cavity; a magnet rotatably positioned within the cavity for creating a magnetic field of a pre-determined configuration emanating from the outer surface of the roller into the substrate; and a means for spinning the magnet within the cavity during the printing process for orienting the magnetic flakes in a predetermined pattern forming an image with an illusion of depth on the substrate.

Continuous Printing

In the embodiments described hereinabove, the magnetic portions of the roller, also referred to herein as the magnets, are discrete in the sense that they are surrounded on the sides by non-magnetic material of the roller. Such magnets are suitable for forming localized images or optical effects on the surface of the substrate where the magnetic ink or paint is dispersed, such as images of objects, logos, indicia, spheres with the illusion of depths etc. However, such discrete magnets may not be suitable for printing onto continuous areas along or across the substrate 212. Magnetic assemblies for this purpose need to provide continuous alignment of magnetic particles as the substrate moves.

As we found, such roller assemblies may contain permanent magnets built-in either along or across magnetic roller. A roller 710 that provides alignment of magnetic flakes along the substrate, i.e. in the direction of its movement during the in-line printing process, is shown in FIGS. 9a and 9b. The roller 710 is assembled, or formed of a plurality of sections 701, each with a ring-like magnetized portion 702. A partially assembled roller 710 is shown in FIG. 9a. Sections 701 with magnetic rings 702 are assembled on an axle 703. Sections 701 are locked on the axle 703 with keys not shown in the FIGS. 9a,b. A driving gear wheel 704 is attached to the roller 710 in order to provide rotating moment to the roller. Fully assembled roller 710 without cover is shown in FIG. 9b. The magnetized portions 702 of the roller extend circumferentially about the roller 710 to form an endless band, or ring for providing a continuous image on the substrate in the linear printing process.

The magnetized portions 702 shaped as rings can be formed using either solid ring magnets, or can be assembled from small, e.g. rectangular shaped magnets as schematically shown in FIGS. 9a and 9b. The magnets may have either side to side, i.e. along the axle 701, or radial magnetization direction.

FIG. 10 schematically illustrates the operation of on an embodiment of the apparatus of the present invention for continuous in-line printing using the roller 710. As illustrated, a total number of the ring-shaped magnetic portions 702 in the roller determines the number of visible rows printed in a substrate 705. In FIG. 10, the roller 710 with magnetic rings 702 is positioned underneath the substrate 705; the rest of the printing apparatus is not shown in the figure but could be similar to the apparatus 200 shown in FIG. 1a. The ribbons 706 are printed on the surface of the substrate 705 by a magnetic field emanating from the magnetized portions, or rings 702, which orients magnetic flakes dispersed on the surface of the substrate opposite to the roller along the magnetic field lines. As shown in the FIG. 10, the ribbons 705 on a top portion of the substrate are printed with the magnetic ink or paint and are dark because the magnetic particles in the ink are not yet aligned by the magnetic field of the roller, and a large portion of light that they reflect is scattered. The roller 710 rotates in a direction shown by an arrow 707 and the substrate 705 moves in a direction 708. Coming into the field of the roller, magnetic particles in the ink or paint are aligned in the direction of magnetic lines of the field, which are in this particular embodiment lie in the plane of the substrate where the substrate and roller are proximate and in contact. Alignment of the particles along the surface of the substrate increases their perceived reflectance and the printed ribbon becomes bright, as illustrated in the lower portion of the substrate in FIG. 10.

In other embodiments, a magnetic roller can include roller sections with continuous ring magnets 702, and roller sections having discrete magnets of selected shapes to form on the substrate a combination of localized images or optical effects and continuous optical features such as the ribbons 705.

In yet another embodiment, the ring-shaped magnetic portions can be formed by selective magnetization in a flexible magnetizable sheet encasing a solid body of the roller described hereinabove with reference to FIG. 3.

Figures 11A, 11B:
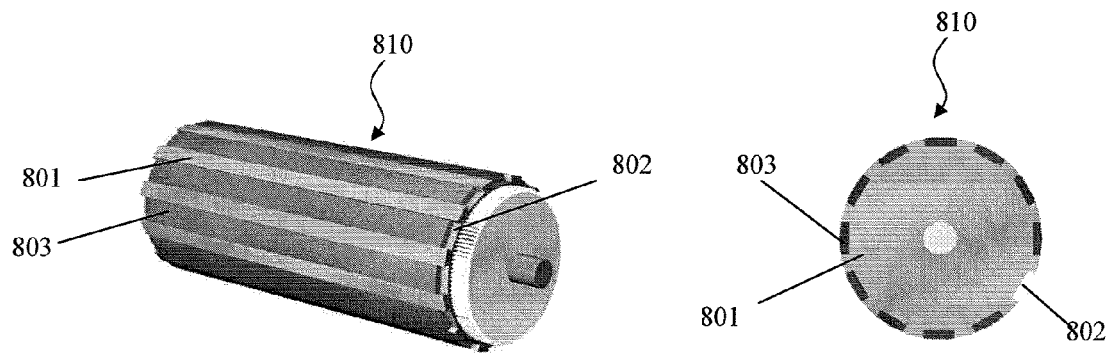

FIGS. 11a and 11b schematically show an embodiment 810 of the magnetic roller, wherein magnetized portions 803 of the roller extends across a working surface of the roller along its rotational axis from end to end of the working surface. The term "working surface" is used herein to mean the outer surface of the roller, or a portion thereof, that comes in contact with the substrate during printing. The cylindrical body 801 of the roller 810 has grooves 802 where elongated magnets 803 are inserted. The grooves 801 and the magnets 802 can have a matching tapered shape. Alternatively, the magnets can be fixed in place by screws, or adhesive, or other suitable method as would be known to one skilled in the art. When mounted in the printing apparatus, the roller can be positioned above the substrate or underneath it.

Figure 12:
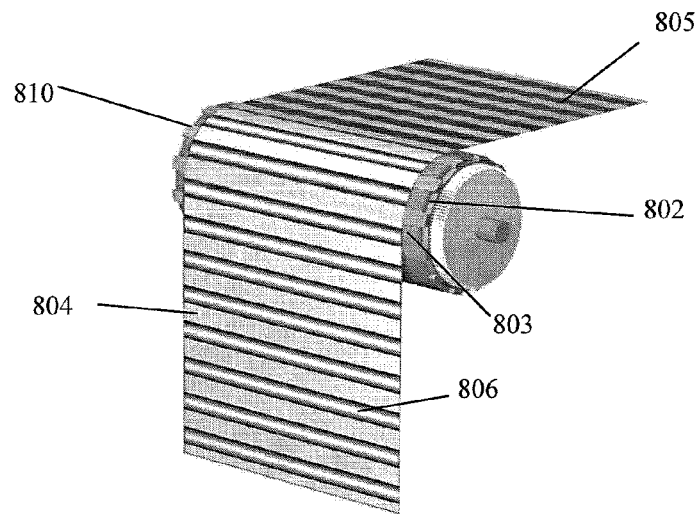

FIG. 12 schematically illustrates a portion of the printing apparatus that includes the roller 810. Here, the roller 810 with the magnets 803 inserted in the grooves 802 is positioned underneath the substrate 804. The substrate 804 approaches the roller with the ribbons 805 of wet magnetic ink, printed on the substrate by one of the press' printing stations right before the magnetic roller. When ribbons come into magnetic field the particles of the pigment align themselves along lines of the field; if the magnets 803 are magnetized in a plane normal to the roller's axis tangentially to the outer surface. As a result of the alignment, the particles start to reflect an incident light in a manner determined by the shape of the field. In a particular embodiment illustrated in FIG. 12, the particles become oriented so to generate the "rolling bar" effect described hereinabove.

The system for the curing of the wet ink with aligned particles was not shown in any detail in the pictures of this patent application in order to keep focus on the principles of design of the magnetic roller. However, it has to be mounted nearby the roller. In some embodiments, it illuminates a narrow area across the substrate with the ink containing aligned particles right above the last quadrant of the roller. In other embodiments, it can be mounted at some distance after the magnetic roller.

It should be understood that each of the preceding embodiments of the present invention may utilize a portion of another embodiment. Of course numerous other embodiments may be envisioned without departing from the spirit and scope of the invention.

We claim:

1. An apparatus for orienting magnetic flakes in a fluid carrier printed on a substrate in a printing process, the apparatus comprising:
    a rotatable roller for positioning with an outer surface proximate to the substrate, said roller comprising:
    a cylindrical body comprising a cavity, and
    a magnet rotatably positioned within the cavity for creating a magnetic field emanating from the outer surface of the roller into the substrate, so as to orient the magnetic flakes in a pattern forming an image providing an illusion of depth when the magnet is rotated within the cavity during the printing process.

2. The apparatus of claim 1, further comprising a means for spinning the magnet within the cavity during the printing process.

3. The apparatus of claim 1,
    comprising an axle upon which the rotatable roller is mounted.

4. The apparatus of claim 3 wherein the magnet is positioned for spinning about an axis normal to the outer surface of the roller.

5. The apparatus according to claim 3, comprising: a rotatable shaft extending radially within the cavity and having an inner end towards the axel and an outer end whereto the magnet is attached.

6. The apparatus according to claim 5, wherein the cylindrical body is rotatably mounted on the axle.

7. The apparatus according to claim 6, comprising a first gear for rotating the cylindrical body of the roller about the axle.

8. The apparatus according to claim 7, wherein the first gear comprises a gear wheel fixedly attached to the cylindrical body of the roller for rotating thereof about the axel.

9. The apparatus according to claim 6, comprising a gear for coupling the magnet with the axle for spinning the magnet within the cavity when the rotatable roller is rotated about the axle.

10. The apparatus according to claim 6 comprising a first bevel gear mounted on the axle, and a second bevel gear mounted at the inner end of the shaft for engaging the first bevel gear, for spinning the magnet within the cavity when the rotatable roller is rotated about the axle.

11. The apparatus according to claim 1, wherein the cylindrical body is of non-magnetic material.

12. The apparatus according to claim 1, wherein the magnet is recessed relative to an outer surface of the cylindrical body of the rotatable roller.

13. The apparatus according to claim 12, further comprising a flexible sheet of non-magnetic material encasing the rotatable roller for providing the outer surface of the roller.

\* \* \* \* \*